United States Patent
Evelyn-Veere

(12) 
(10) Patent No.: US 7,229,026 B2
(45) Date of Patent: Jun. 12, 2007

(54) SYSTEM AND METHOD FOR USE IN CONTROLLING IRRIGATION AND COMPENSATING FOR RAIN

(75) Inventor: René H. Evelyn-Veere, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 308 days.

(21) Appl. No.: 10/966,977

(22) Filed: Oct. 15, 2004

(65) Prior Publication Data
US 2005/0082382 A1    Apr. 21, 2005

Related U.S. Application Data

(60) Provisional application No. 60/512,037, filed on Oct. 17, 2003.

(51) Int. Cl.
| | |
|---|---|
| B05B 17/04 | (2006.01) |
| A01G 25/00 | (2006.01) |
| A01G 25/16 | (2006.01) |
| A01G 27/00 | (2006.01) |
| G05D 7/00 | (2006.01) |
| G05D 11/00 | (2006.01) |

(52) U.S. Cl. .............. 239/11; 239/63; 239/65; 239/69; 700/284

(58) Field of Classification Search ............ 239/11, 239/63, 65, 69, 64, 67, 68, 70, 71, 723; 137/78.2, 137/78.3; 700/284, 283
See application file for complete search history.

(56) References Cited

U.S. PATENT DOCUMENTS

| | | | |
|---|---|---|---|
| 4,014,359 A | 3/1977 | Sanner | |
| 4,015,366 A | 4/1977 | Hall, III | |
| 4,130,382 A | 12/1978 | Bode | |
| 4,244,022 A * | 1/1981 | Kendall | ............ 700/284 |
| 4,856,227 A | 8/1989 | Oglevee et al. | |
| 4,858,377 A | 8/1989 | Oglevee et al. | |
| 5,023,787 A | 6/1991 | Evelyn-Veere | |

(Continued)

OTHER PUBLICATIONS

International Searching Authority, "International Search Report", cited in corresponding PCT application PCT/US04/34137, dated Apr. 13, 2005, 8 pages.

(Continued)

*Primary Examiner*—Kevin Shaver
*Assistant Examiner*—Darren Gorman
(74) *Attorney, Agent, or Firm*—Fitch, Even, Tabin & Flannery

(57) ABSTRACT

The present embodiments provide methods and system for use in irrigating and controlling irrigation. In some embodiments, a method pauses irrigation at a field station when an amount of rain detected exceeds a first threshold, detects an indication of an amount of rain received after the pausing, resumes irrigation, and reduces a station runtime corresponding to the amount of the rain received after pausing. Some methods determine when an amount of rain received exceeds a first threshold and pause irrigation from a field station, and determine when the amount of rain received exceeds a second threshold and stop irrigation from the field station. Some embodiments provide systems that comprise a field station, a rain detector, and a controller that monitors detected rain and pauses irrigation when a first threshold of rain is detected and shuts down irrigation when a second threshold of rain is detected.

19 Claims, 10 Drawing Sheets

U.S. PATENT DOCUMENTS

| | | | |
|---|---|---|---|
| 5,097,861 A | 3/1992 | Hopkins et al. | |
| 5,208,855 A | 5/1993 | Marian | |
| 5,229,937 A | 7/1993 | Evelyn-Veere | |
| 5,272,620 A * | 12/1993 | Mock et al. | 700/16 |
| 5,355,122 A | 10/1994 | Erickson | |
| 5,381,331 A * | 1/1995 | Mock et al. | 700/16 |
| 5,444,611 A * | 8/1995 | Woytowitz et al. | 700/16 |
| 5,479,339 A | 12/1995 | Miller | |
| 5,668,719 A | 9/1997 | Bobrov et al. | |
| 5,696,671 A | 12/1997 | Oliver | |
| 5,839,660 A | 11/1998 | Morgenstern et al. | |
| 5,870,302 A | 2/1999 | Oliver | |
| 6,076,740 A * | 6/2000 | Townsend | 239/1 |
| 6,145,755 A | 11/2000 | Feltz | |
| 6,276,298 B1 | 8/2001 | Welsh | |
| 6,298,285 B1 | 10/2001 | Addink et al. | |
| 6,314,340 B1 | 11/2001 | Mecham et al. | |
| 6,343,255 B1 | 1/2002 | Peek et al. | |
| 6,453,216 B1 | 9/2002 | McCabe et al. | |
| 6,585,168 B1 | 7/2003 | Caprio | |
| 6,675,098 B2 | 1/2004 | Peek et al. | |
| 6,782,311 B2 | 8/2004 | Barlow et al. | |
| 6,850,819 B1 * | 2/2005 | Townsend | 700/284 |
| 2001/0049563 A1 | 12/2001 | Addink et al. | |
| 2002/0010516 A1 | 1/2002 | Addink et al. | |
| 2002/0014539 A1 | 2/2002 | Pagano et al. | |
| 2002/0020441 A1 | 2/2002 | Addink et al. | |
| 2002/0029111 A1 | 3/2002 | Peek et al. | |
| 2002/0166898 A1 | 11/2002 | Buhler et al. | |
| 2002/0183935 A1 | 12/2002 | Skinner | |
| 2003/0093159 A1 | 5/2003 | Sieminski | |
| 2003/0109964 A1 | 6/2003 | Addink et al. | |
| 2003/0179102 A1 | 9/2003 | Barnes | |
| 2003/0182022 A1 | 9/2003 | Addink et al. | |
| 2003/0208306 A1 | 11/2003 | Addink et al. | |
| 2004/0003045 A1 | 1/2004 | Tucker et al. | |
| 2004/0011880 A1 | 1/2004 | Addink et al. | |
| 2004/0015270 A1 | 1/2004 | Addink et al. | |
| 2004/0039489 A1 | 2/2004 | Moore et al. | |
| 2004/0089164 A1 | 5/2004 | Addink et al. | |

OTHER PUBLICATIONS

RainBird "Cirrus Central Control System", www.rainbird.com/golf/products/centralcontrol/cirrius.htm, last updated Jun. 14, 2005.

* cited by examiner

023
SYSTEM AND METHOD FOR USE IN CONTROLLING IRRIGATION AND COMPENSATING FOR RAIN

PRIORITY CLAIM

This application claims the benefit of U.S. Provisional Application No. 60/512,037, filed Oct. 17, 2003, entitled IRRIGATION CONTROLLER HAVING RAINFALL COMPENSATOR, which is incorporated herein by reference in its entirety.

FIELD OF THE INVENTION

The present embodiments relates generally to irrigation systems, and more specifically toward controlling irrigation.

BACKGROUND

Irrigating geographic areas can be very complex. Many systems employ a diverse irrigation program to efficiently supply appropriate amounts or water. Often in implementing irrigation, adjacent areas have very different watering needs adding to the complexity.

Many irrigation systems attempt to optimize the watering efficiency. Further, systems attempt to avoid over watering. Rain, however, often interferes with the optimal watering of plant life already receiving water from an irrigation system. Large amounts of rain along with water delivered from the irrigation system can damage plant life, which can be economically devastating for some irrigated areas such as agriculture, golf courses and other such areas.

Some irrigation systems shut down the irrigation if a predefined amount of rain is detected. These systems, however, do not provide accurate and efficient watering. Further, these systems often waste water because of slow response times.

SUMMARY OF THE EMBODIMENT

The present embodiments advantageously address the needs above as well as other needs through methods and system for use in irrigating plant life and/or implementing and controlling irrigation programs. In some embodiments, methods for use in controlling irrigation are provided. These methods determine when an amount of rain received exceeds a first threshold, and pause irrigation from a field station when the amount of rain exceeds the first threshold. Further, these methods determine when the amount of rain received exceeds a second threshold, and stop irrigation from the field station when the amount of rain exceeds the second threshold.

Alternative methods are provided in some embodiments for use in controlling irrigation. These methods pause irrigation at a field station when an amount of rain detected exceeds a first threshold, detect an indication of an amount of rain received after the pausing, resume irrigation at the field station, and reduce a station runtime corresponding to the amount of the rain received after pausing the irrigation at the field station.

Some embodiments provide a system for use in controlling irrigation. The system comprises a controller; a field station coupled with the controller, wherein the controller activates the field station to irrigate; a first switch coupled with the field station, where the first switch transitions when an amount of rain detected exceeds a first threshold causing the field station to pause the irrigating; and a second switch coupled with the field station, where the second switch transitions when an amount of rain detected exceeds a second threshold causing the field station to stop the irrigating.

Another system for use in irrigation according to some implementations includes a controller, a field station and a rain detector. The field station is coupled with the controller such that the controller controls irrigation through the field station. The rain detector is coupled with the controller such that the controller monitors an amount of rain detected through the rain detector. The controller pauses irrigation from the field station when a first threshold amount of rain is detected and shuts down irrigation from the field station when a second threshold amount of rain is detected.\

Additional embodiments provide a method for use in controlling irrigation. The method identifies a rain watch window of time, monitors an amount of rain detected, monitors a time as the rain is detected, excludes rain detected outside the rain watch window, and pauses irrigation when a first threshold amount of rain is detected within the time window.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
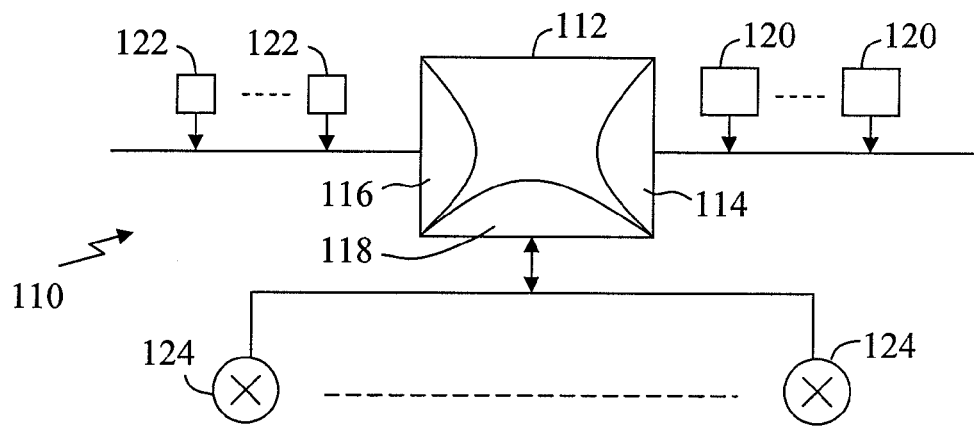
FIG. 1 depicts a simplified block diagram of an irrigation control system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in implementing irrigation and/or watering of plant life. These methods and systems take real time advantage of rainfall while irrigation is in progress. Further, these methods and systems take the rainfall into account for subsequently scheduled irrigation events. Through the present embodiments, irrigation can be controlled by detecting rainfall early and pausing irrigation while rain continues. Once the rain stops, the embodiments allow irrigation to resume while reducing irrigation runtime proportional to an amount of rain received. As such, the present embodiments react to intermittent rainfall. Still further, the present embodiments cancel and/or shutdown pending irrigation when a second predefined amount of rain is detected. The method and systems can be utilized with substantially any irrigation system for watering substantially any area, such as agricultural areas, golf courses, industrial sites, campuses, residences, and substantially any other such relevant sites.

FIG. 1 depicts a simplified block diagram of an irrigation control system 110 according to some embodiments. The system includes a controller 112 coupled with one or more weather stations 120 that collect weather data and forward the weather data to the controller 112. One or more rain detectors 122 couple with the controller 112 to notify the controller when rain is detected and/or how much rain has been detected. In some implementations, the rain detector(s) are implemented as rain cans and/or tipping buckets that notify the controller 112 every time a predefined amount of rain is received (e.g., every time 0.01 inches of rain is received or some other predefined amount). In some other embodiments, the rain detectors 122 are implemented through "mini-click" rain detectors that are triggered when predefined levels of rain are received. Tip cans and mini-click detectors are well known types of rain detectors. The rain detectors 122 can be implemented through substantially any relevant detectors and/or combinations of detectors.

The controller utilizes the weather information from the weather stations 120 and the detected rain data to control one or more valves and/or field stations 124 to implement a desired irrigation program. For example, the controller utilizes evapotranspiration (ET) values that are supplied by the weather station to determine field station irrigation runtimes. ET values are estimated energy values that represent amounts of water evaporated and transpired by plant life (e.g., grass, crops, and other plant life) in response to environmental conditions. An ET value is typically a function of temperature, wind, humidity, moisture in the ground, and other such relevant parameters.

In some embodiments, the controller includes one or more processors and/or microprocessors for evaluating data received from the weather stations 120 and rain detectors 122, and to control irrigation. The controller 110 includes, in some embodiments, an evapotranspiration (ET) evaluator 114, a rainfall compensation calculator 116, and a field station controller 118. The ET values received from the weather stations are used by the ET evaluator and/or field station controller 118 to further determine and control station irrigation runtimes for each valve or field station 124, and/or each sprinkler, rotor, or other water delivery device supplied by field stations 124.

The rain detectors 122 provide data relating to the amount of rainfall detected. The amount of rain is supplied to the rainfall compensation calculator 116 where, in some embodiments, an equivalent rain irrigation runtime is determine for each field station 124 and/or sprinkler. The field station controller 118 utilizes these calculated rain irrigation runtimes to reduce the total station runtimes for each valve, field station and/or sprinkler in real time to provide for real time rain compensation. In some implementations, this compensation may prevent further irrigation from one or more of the field stations.

The controller 112 is shown directly coupled with and controlling multiple field stations 124. The controls of the irrigation system 110 can be distributed over the system. For example, the controller 112 can be a central controller coupled with a plurality of satellite or sub controllers.

Figure 2:
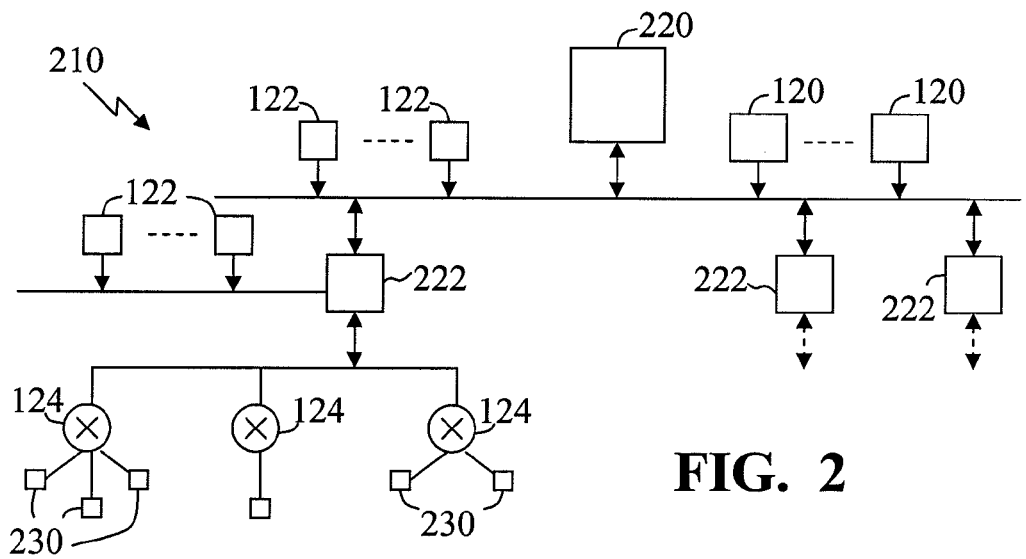
FIG. 2 depicts a simplified block diagram of an expanded irrigation system.

FIG. 2 depicts a simplified block diagram of an irrigation system 210 according to some embodiments. The system includes a central controller 220 coupled with a plurality of satellite controllers 222. Weather stations 120 and/or rain detectors 122 couple with the central controller to provide weather and/or rain data.

In some embodiments, one or more rain detectors 122 are coupled with one or more of the satellite controllers 222. These rain detectors are positioned, in some implementations, geographically close to the satellite controllers 222 to provide rain data that is more specific to areas controlled by the satellite controller. In some embodiments, the satellite controller further includes a rain compensation calculator and/or field station controller. The rain compensation calculator utilizes the amount of local rain detected by the rain detectors 122 and/or other data or controls provided by the central controller 220 in real time to pause, adjust a runtime, and/or shutdown local field stations 124. In some embodiments, this runtime compensation is calculated and implemented for each sprinkler, rotors, drip line, and/or other water delivery device 230.

Figure 3:
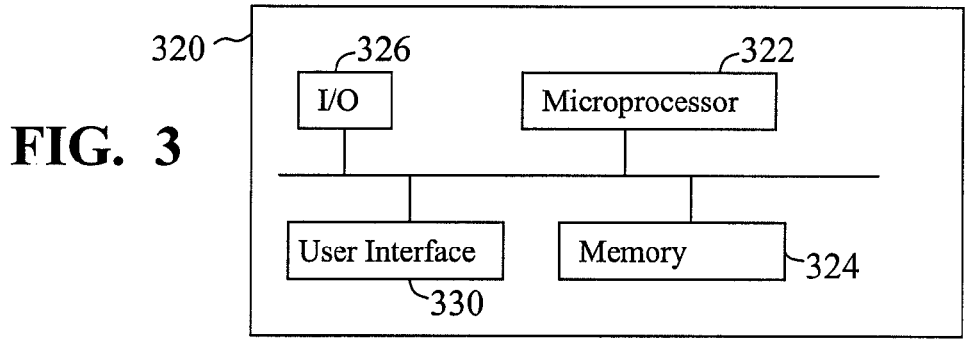
FIG. 3 depicts a simplified block diagram of a controller according to some embodiments that can be implemented as a central controller or a satellite controller in the systems of FIGS. 1 and/or 2.

FIG. 3 depicts a simplified block diagram of a controller 320 according to some embodiments that can be implemented as a central controller 112 or a satellite controller 222. The controller includes a processor 322, such as a microprocessor, that provides the general computational processing and implementation of the irrigation program. The controller 320 further includes a memory and/or computer readable medium 324 that stores irrigation runtime parameters, irrigation control programming, other programs, data, and executables. The memory can be implemented through ROM, RAM, disk drives, and substantially any other relevant memory or combinations of memory. The memory 324, in some embodiments, further includes the ET evaluator 114, rain compensation calculator 116 and/or field station controller 118 stored as software which are implemented through the processor 322. Accordingly, in some embodiments, the processor described for example in conjunction with FIGS. 4–6 and 9 may be performed by software stored in memory and executed on the processor, or otherwise stored and executed in firmware.

The controller further includes inputs and outputs (I/O) 326. The inputs allow the controller to receive irrigation control parameters from a user and/or other systems, data such as rain data from rain detectors, weather data, and other such data for use by the controller in implementing a desired irrigation program. The outputs allow the controller 320 to communicate with other controllers (e.g., satellite controllers, main controller, and other devices), and to communicate and control field stations 124 for implementing irrigation runtimes. In some embodiments, the controller include the I/O 326 to receive parameters, user control information, weather data (e.g., ET values), software updates, and other relevant data, information and/or programming. For example, the controller can receive software to implement the rain pause, shutdown and rain compensation applications of the present embodiment as an upgrade through the I/O allowing existing controllers to be upgraded to provide the real time pause, shutdown, and rain compensation functionalities. In some embodiments, the controller further includes a user interface 330 that allows a user to enter and/or edit irrigation programs, parameters, and other relevant control information. The user interface can include buttons, dials, switches, keyboard, tracking device, and other such components.

The irrigation systems 110, 210 of the present embodiments allow for real time compensation for detected rain. As such, the system can quickly pause irrigation when rain is detected. Further, once the rain has stopped, the system allows for irrigation to resume while compensating for the runtime of the irrigation proportional to the amount of rain detected. By allowing real time pausing and restarting of the irrigation, the present embodiments can immediately pause the system, or pause the system upon the detection of a minimal predefined amount so that the system prevents watering early when rain is detected. Once the rain stops, the system resumes the irrigation while compensating for the amount of rain received. In some preferred embodiments, the system further prevents further irrigating and/or shuts down at least part of the irrigation system when a subsequent or second predefined amount of rain is received.

Figure 4:
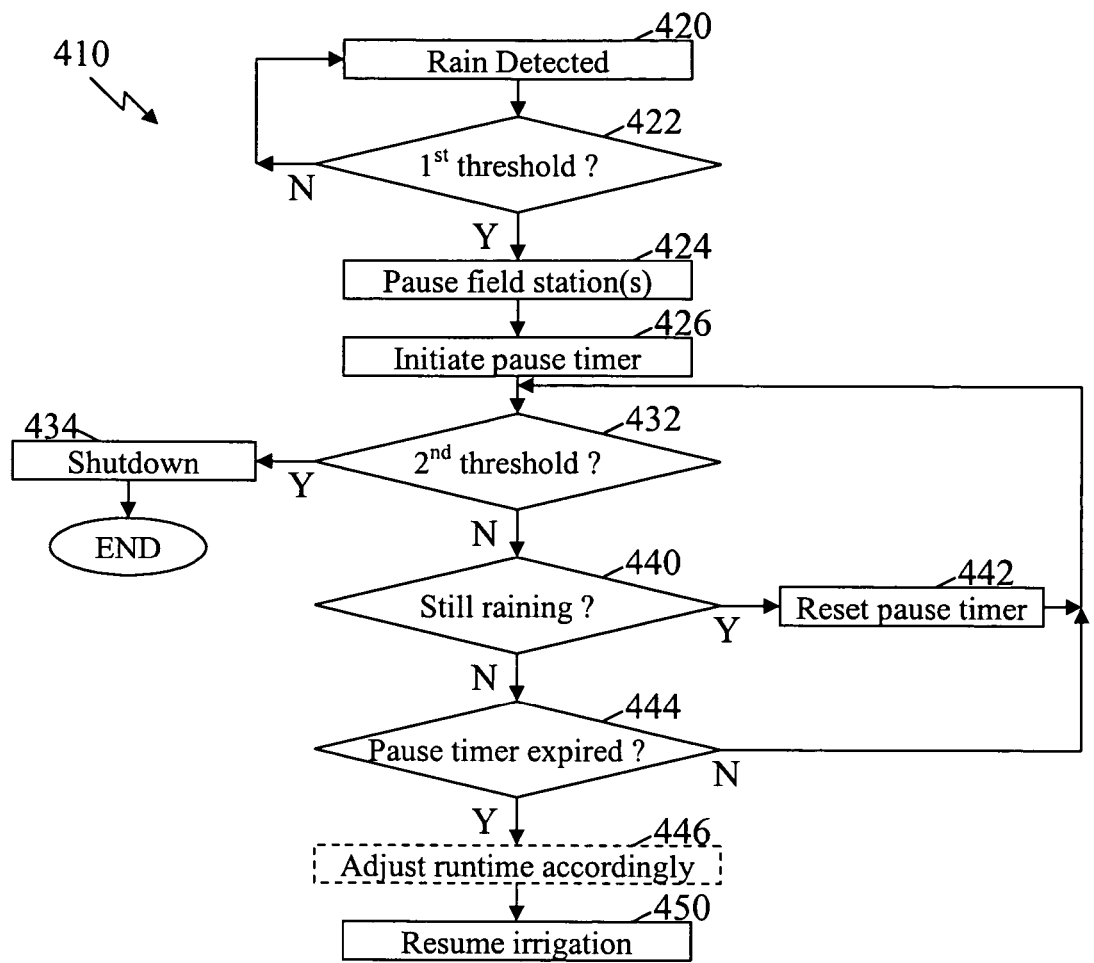
FIG. 4 depicts a simplified flow diagram of a process that is utilized in some embodiments for controlling irrigation.

FIG. 4 depicts a simplified flow diagram of a process 410 that is utilized in some embodiments for controlling irrigation. In step 420, the system is notified that it is raining. In some embodiments, rain detectors, such as tip cans, forward a pulse upon the detection of a predefined amount or unit of rain (e.g., 0.01 inches of rain causes the tip can to tip, sending an electronic pulse to the controller). Upon receiving the notification of rain, the process determines in step 422 whether a first threshold amount of rain has been received. The first threshold can be set to substantially any value, and in some preferred implementations is set with a relatively low threshold so that irrigation can be paused as early as possible. Often, however, the systems do not want to pause the irrigation unless it really is raining, as such some embodiments implement a mechanism that monitors the amount of detected rain, such as a counter that counts the pulse received from a tip can. If the first threshold of rain has not been received, the process 410 loops around to wait for further detection of rain.

If a detected amount of rain does exceed the first threshold in step 422, step 424 is entered where the process enters a pause mode and pauses further irrigation from field stations, at least in those areas relatively close to the detector(s) indicating that rain exceeds the first threshold. In step 426, a pause timer is activated that monitors how long a system has been in a pause mode. In step 432, the process determines if an amount of rain detected exceeds a second threshold. If a second threshold is exceeded, step 434 is entered where the process 410 places the system in a shutdown or off mode and shuts down or prevents further automatic irrigation starts at least in those areas where the rain exceeded the second threshold, and resets or clears shutdown threshold measurements. This shut down prevents the irrigation from being reactivated for a shutdown period or window of time. For example, this shutdown period of time can be set as a default value (e.g., until the next scheduled irrigation for that area, or a fixed time such as 24 hours), and/or can be user defined. In some implementations, the system continues to monitor the amount of rain received while in the shutdown mode, and each time an amount of rain received exceeds the shutdown threshold, the shutdown period of time is reset and the shutdown threshold measurements are cleared.

If the second threshold has not been exceeded in step 432, the process 410 continues to step 440 where it is determined whether it is still raining. If it is still raining, step 442 is entered where the pause timer is reset and the process returns to step 432 to determine whether the continued rain exceeds the second threshold. Alternatively, if it is not still raining at step 440, the process enters step 444 where it determines whether a pause timer has expired indicating that a predefined period of time has elapsed since rain was detected. If the pause timer has not expired, the process returns to step 432. If the pause timer has elapsed, the process 410, in some embodiments, continues to an optional step 446 where remaining runtimes of sprinklers are reduced proportional to an amount of the detected rain. In step 450, the irrigation is resumed according to the remaining runtime and/or adjusted runtime.

The pause timer is set in some implementations to a relatively short time so that the system quickly resumes irrigating when only a small amount or a burst of rain is detected (e.g., 10 minutes, 15 minutes or some relevant value). Because the pause timer is reset when continuing to detect rain, the system does not reactivate the irrigation prematurely. Therefore, the present embodiments allow irrigation systems to be immediately paused in the event intermittent rainfall is detected, and further to allow for real time compensation for the amount of rain received.

As indicated above, in some embodiments, one or more rain counters are utilized to track the amount of rain received. For example, the controller can employ a total rain counter that increments each time a pulse is received from a tip can rain detector indicating that a predefined amount of rain (e.g., 0.01 inches) is received. The system continues to increment the one or more rain counters to allow for the determination of how much rain is received within predefine time periods and to determine the reduction in station irrigation runtime to compensate for the amount of rain received. Some embodiments, further determine the rate at which rain is received. This allows the system to more accurately compensate for an effective amount of rain that is actually absorbed by the soil. For example, if three inches of rain is received in thirty (30) minutes, the majority of that rain is going to run off the soil because the soil only has a limited capacity and can absorb a limited amount of water over a period of time, and typically, three inches of rain cannot be absorbed in thirty minutes. Therefore, some preferred embodiments, take into account the rate of rain received and/or the absorption rate of the area being irrigated to more accurately determine an effective amount of rain.

Figure 5:
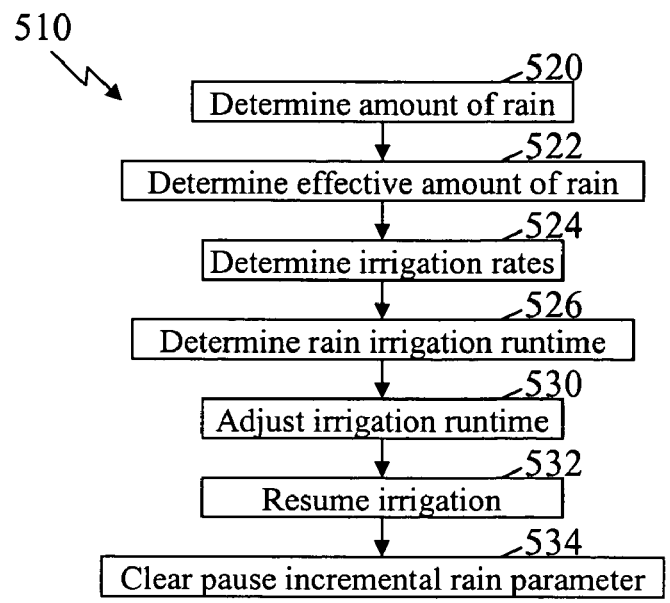
FIG. 5 depicts a simplified flow diagram of a process for determining runtime adjustments for irrigation systems.

FIG. 5 depicts a simplified flow diagram of a process 510 for determining runtime adjustments for irrigation systems. The process 510 is implemented, in some embodiments, for the optional step 446 in the process 410 for controlling irrigation. In step 520, an incremental amount of rain detected since a pause was initiated is determined. In some embodiments, upon initiation of a pause, an incremental rain counter is activated counting the number of pulses received from a rain detector allowing for the determination of the amount of rain received since a pause. In step 522, an effective amount of rain is determined that is proportional to the incremental amount of rain relative to the rate at which that rain is received and can account for run-off or rain not absorbed.

In step 524, the process 510 determines an irrigation or precipitation rate for each field station and/or sprinkler for which that compensation is to be applied. This is generally a known rate based on the amount of water delivered (e.g., based on type of sprinkler or other water delivery device, the water pressure applied to the sprinkler, the area being irrigated, and other such parameters). In step 526, a rain irrigation runtime is determined for each field station or sprinkler based on the effective amount of rain detected relative to the irrigation and/or precipitation rate for each field station or sprinkler.

In step 530, the process reduces the station runtime and/or remaining runtime for each field station/sprinkler according to the calculated rain irrigation runtime. Some implementations utilize a system reference ET value combined with a default runtime when an irrigation rate is unavailable to determine adjustments. In step 532, irrigation is resumed according to the adjusted irrigation runtime when the remaining runtime is greater than zero. In step 534, the pause incremental rain amount is reset or cleared.

Some embodiments further enhance the compensation of rain by eliminating or avoiding compensating for rain that was received outside a defined time window relative to a current time. Rain that is considered "old" rain is rain that has already been incorporated into the soil and plants, and is no longer considered in rain compensation calculations. For example, in some weather conditions and with some soils, rain that is received more than forty eight hours prior than a current time is no longer included in runtime compensations. In some embodiments, a rain watch window is employed that defines a window of time relative to a current time when runtime compensation calculations are being made in which rain received is relevant to a determination affecting current watering needs. Rain received outside of the rain watch window is excluded from compensation calculations in some embodiments. As such, rainfall collected through some implementations is maintained until the rain watch window of time has elapsed since the last rain pulse.

Figure 6:
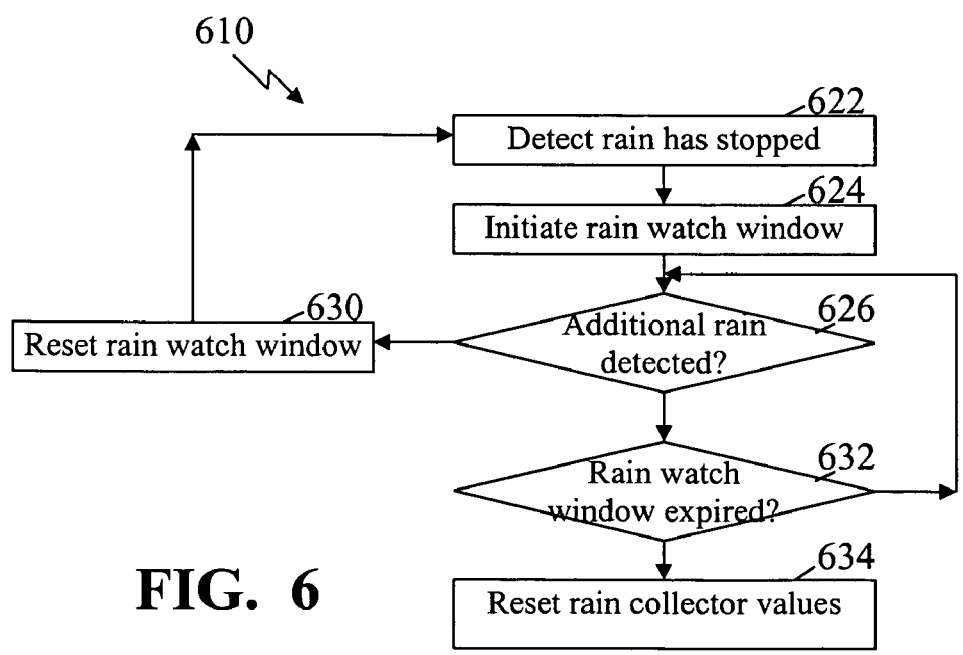
FIG. 6 depicts a simplified flow diagram of a process for use in determining an amount of rain to be utilized according a rain watch window in determining rain compensation calculations.
Figure 7:
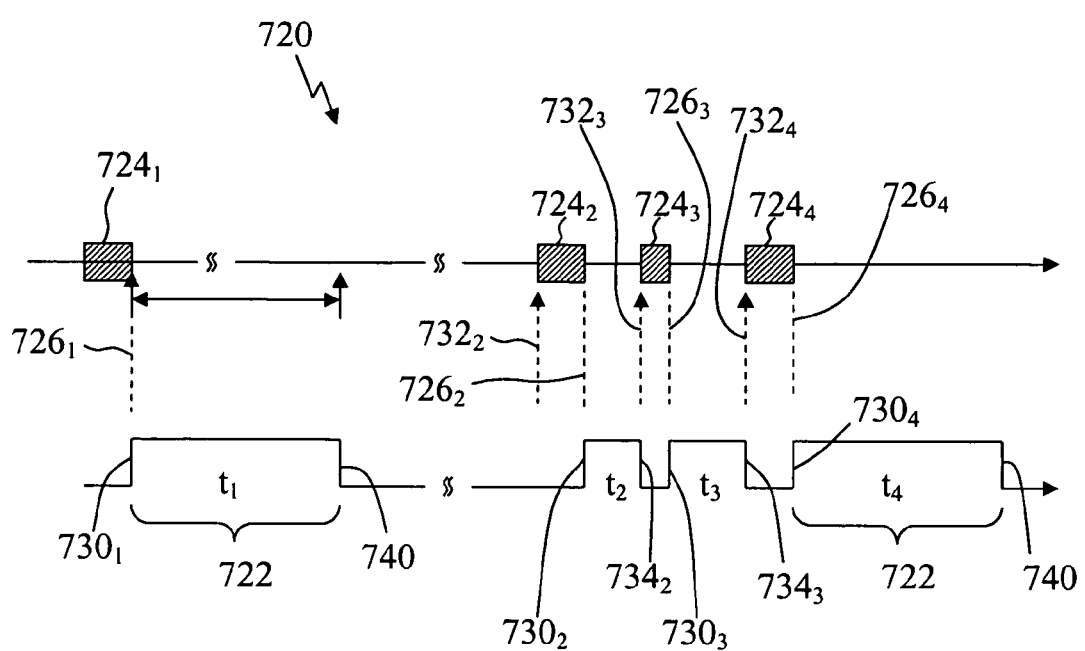
FIG. 7 depicts a simplified graphical representation of a time line showing the launching of irrigation programs.

FIG. 6 depicts a simplified flow diagram of a process 610 for use in determining an amount of rain to be utilized in determining rain compensation calculations and compensating for rain that is defined by the system as no longer being effective for irrigation purposes. FIG. 7 depicts a simplified graphical representation of a time line 720 showing the tracking of a rain watch window of time 722 that is used to identify when rain should be excluded from compensation calculations as the rain is no longer effective for irrigation purposes and is considered "old" rain. In some embodiments, the rain watch window is a timer that is initiated once rain stops and continues to increment as long as rain is not received until an expiration of the predefined watch window of time.

Referring to FIGS. 6 and 7, in step 622 the process 610 detects that rain 724 has stopped 726. In step 624, a rain watch window timer 730 is initiated (e.g., see time $t_1$ of FIG. 7). In step 626, it is determined whether additional rain is detected 732. When additional rain is detected, step 630 is entered where the rain watch window timer is reset 734 (for example, see time $t_2$ at $734_2$ and time $t_3$ at $734_3$ of FIG. 7). The process then returns to step 622 to await the detection that the rain has stopped.

When it is determined in step 626 that additional rain is not detected, the process continues to step 632 where it is determined whether the rain watch window has expired 740. If the time has not expired, the process returns to step 626. Alternatively, when the rain watch window timer has expired, step 634 is entered where rain collector values are reset (e.g., to zero values), including the pause and/or shutdown threshold counters, rain detected during a pause $IR_{pause}$, effective rain bucket parameter $R_b$ (as fully described below), and other such collector values, so that the old rain (e.g., $724_2$–$724_4$) does not cause a pause or shutdown because the amount of rain defined by the collector values is old rain and no longer has irrigation effects.

For example, referring to FIG. 7, when the system detects that the rain has stopped 726, the rain watch window is activated $730_2$ (e.g., see time $t_2$). The rain watch window continues to increment (or decrement) unless additional rain $724_3$ is detected prior to the rain watch window expiring. When rain is detected, the rain watch window is reset 734 until the rain stops $726_3$ and the rain watch window is again activated $730_3$ (see time $t_3$). Again, when the rain stops $726_4$, the rain watch window is activated $730_4$ and continues to increment until it expires 740 or rain is again detected. When the rain watch window expires, the system resets and/or clears the rain tracking or accumulation values, such as the pause incremental rain parameter $IR_{pause}$, the shutdown incremental rain parameter $IR_{shutdown}$, and other such counters (e.g., see launch incremental rain parameter $IR_{launch}$, runtime incremental rain parameter $IR_{run}$, and other such parameters as are fully described below). By clearing the rain tracking values, the system avoids continuing to compensate for rain that is old and no longer has irrigation effects.

The rain watch window provides for a time frame during which rain is not detected, and is the time at expiration that old rain is discarded. When rain is detected during the rain watch window of time, the rain is applied towards pause and/or shutdown determinations, and is used to reduce irrigation runtime. Further, the rain watch window is a rolling time frame that is typically not associated with specific irrigation events, but rather represents a contiguous time without rain at least equaling the rain shutdown parameter.

The rain watch window 722 is utilized to eliminate rain that no longer has irrigation effects. The amount of time covered by the window in some implementations is adjustable for specific locations to be irrigated. Rain detected outside the rain watch window 722 is considered "old" rain and excluded from further adjustments of irrigation runtimes. Some embodiments more accurately determine effective rain by utilizing the rain watch window. Thus, the systems more accurately adjust irrigation run times according to rain received to maintain a desired soil saturation level.

In some embodiments, measured ET values are utilized in determining station runtimes. The ET values are supplied to the central controller 112 and/or satellite controller(s) 222 which utilize the ET value in determining station runtimes for each field station and/or sprinkler. Based on the ET values, the amount of irrigation is determined to maintain the soil at desired soil saturation levels. The present embodiment, in some implementations, further utilizes locally measured rain to adjust the received ET values in generating one or more adjusted or net ET values. These net ET values are then utilized by the controller or satellite controllers to determine desired runtimes that take into consideration the received rain.

Figure 8:
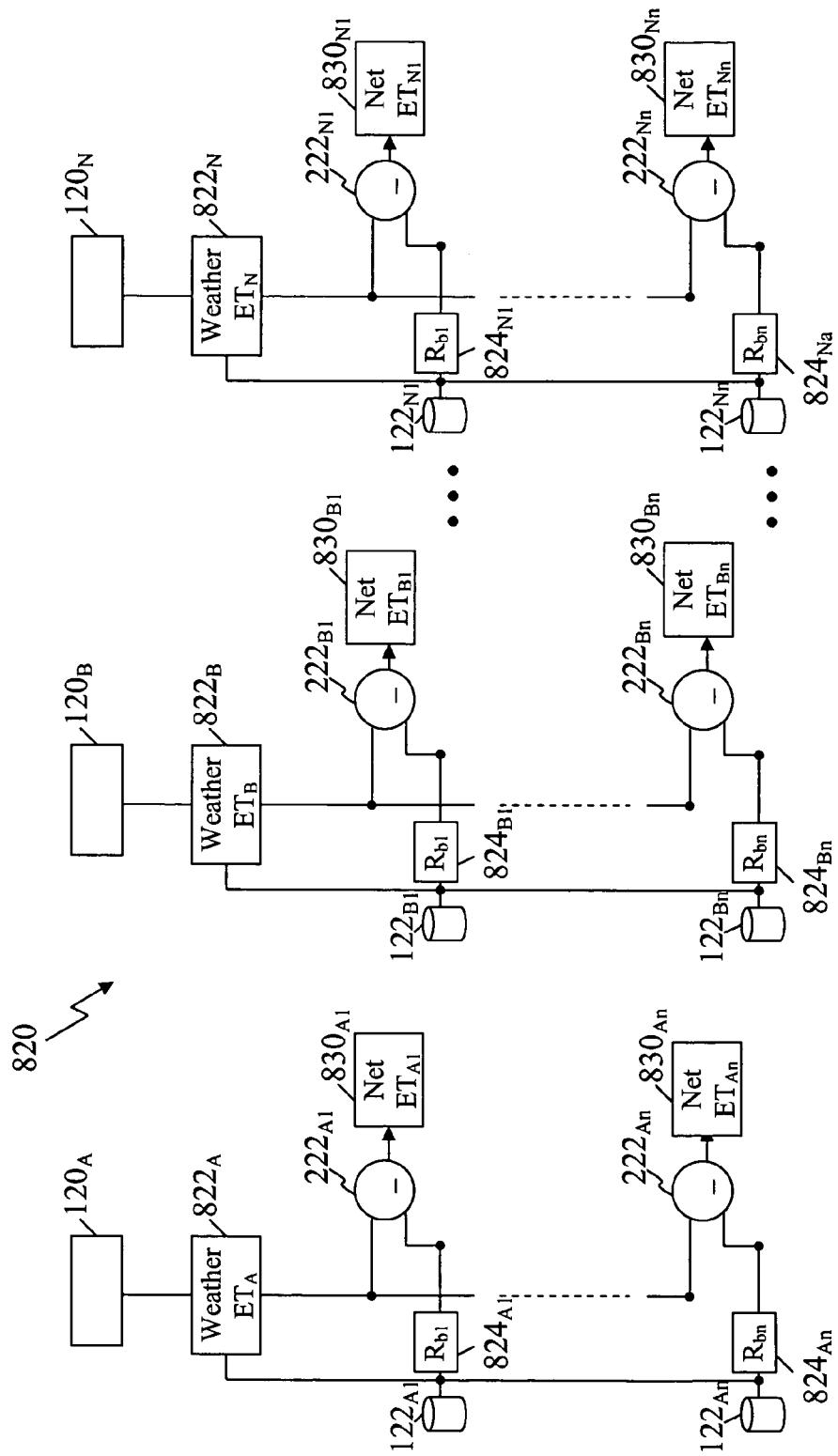
FIG. 8 depicts a simplified block diagram of a system according to some embodiments that is utilized in determining net evapotranspiration (ET) values that compensate for received rain.

FIG. 8 depicts a simplified block diagram of a system 820 according to some embodiments that is utilized in determining net ET values that compensate for received rain. One or more weather stations $120_A$–$120_N$ supply weather ET values $822_A$–$822_N$ to one or more controllers and/or satellite controllers $222_{A1}$–$222_{Nn}$. One or more rain detectors $122_1$–$122_n$ (e.g., tip cans) couple with the satellite controllers to supply detected rain amounts and/or counts $824_1$–$824_n$. Each weather station can utilize one or more rain detectors in calculating the ET and other parameters. Similarly, each satellite controller can utilize rain measurements from multiple rain detectors to generate fairly localized net ETs and net $R_b$ values. In some embodiments, the rain amounts $824_1$–$824_n$ are simply pulses received from the rain detectors each time a predefined amount of rain is received, and the satellite controllers increment counters each time a pulse is received from the rain detectors. The rain detectors and/or satellite controllers further track timing of rain received and thus determine a real time rate of rain in order to determine an effective amount of rain $R_b$ that is absorbed to replenish at least part of water lost through evaporation and use by plants. The effective or usable rain $R_b$ in some embodiments is effectively a simulated rain bucket simulating a collection of usable or effective rain based on a maximum rainfall rate for a period of time (e.g., rate/hour) and soil reservoir capacity.

Based on predefined parameters and/or conditions, the satellite controllers have a time-to-runoff rate that defines a rate of rain at which rain in excess of this rate is considered runoff and thus ineffective for irrigating. In some embodiments, the time-to-runoff is a threshold ratio of a rain capacity (e.g., defined in inches) per period of time (e.g., amount of rain per minute, per 10 minutes, or substantially any other time period, but some preferred implementations track rates at low time resolutions providing greater precision in measured values), often defined based on a maximum hourly rate. Further, the soil typically has a soil capacity for absorbing water, and once reached, the remainder of rain received is also runoff.

Some embodiments exclude runoff rain (rain received in excess of the soil capacity and/or time-to-runoff) thus providing the effective amount of rain $R_b$ to be used in determining adjustments to the weather ET values 822 received from weather stations 120. The time-to-runoff in some implementations varies based on present weather conditions, soil conditions, duration of rain, and other such parameters. The time-to-runoff in some embodiments is a default value. Some embodiments additionally allow a user to define the time-to-runoff and/or parameters (e.g., soil characteristics and the like) that are used to calculate a time-to-runoff and/or soil capacity.

The satellite controllers utilize the effective amount of detected rain $R_{b1}$–$R_{bn}$ in adjusting the weather ET values $822_A$–$822_N$ to generate local net ET values $830_{A1}$–$830_{Nn}$.

The local net ET values are utilized by the satellite controllers to calculate runtimes for the local sprinklers and/or other water delivery devices controlled by the satellite controller. For example, a first controller $222_{A1}$ receives a weather ET value $822_{A1}$ from a first weather station $120_{A1}$, and further receives a first effective rain value $824_1$ from a first rain detector $122_{A1}$. Utilizing the first effective rain value (supplied by the rain detector or determined by the first satellite controller $222_{A1}$) the satellite controller $222_{A1}$ determines an ET adjustment value. The weather ET value $822_{A1}$ is adjusted according to the ET adjustment value to generate a first net ET value $830_{A1}$. Net ET values 830 can be generated by substantially any number of controllers based on weather ET values from substantially any number of weather stations, and effective rain values from substantially any number of rain detectors. In some embodiments, the effective rain $R_b$ utilized in adjusting the weather ET values is further limited to rain detected after the weather station 120 generates the weather ET value 822 as described fully below (see FIGS. 9 and 10), and/or that is within the rain watch window 730 (see FIG. 7).

Figure 9:
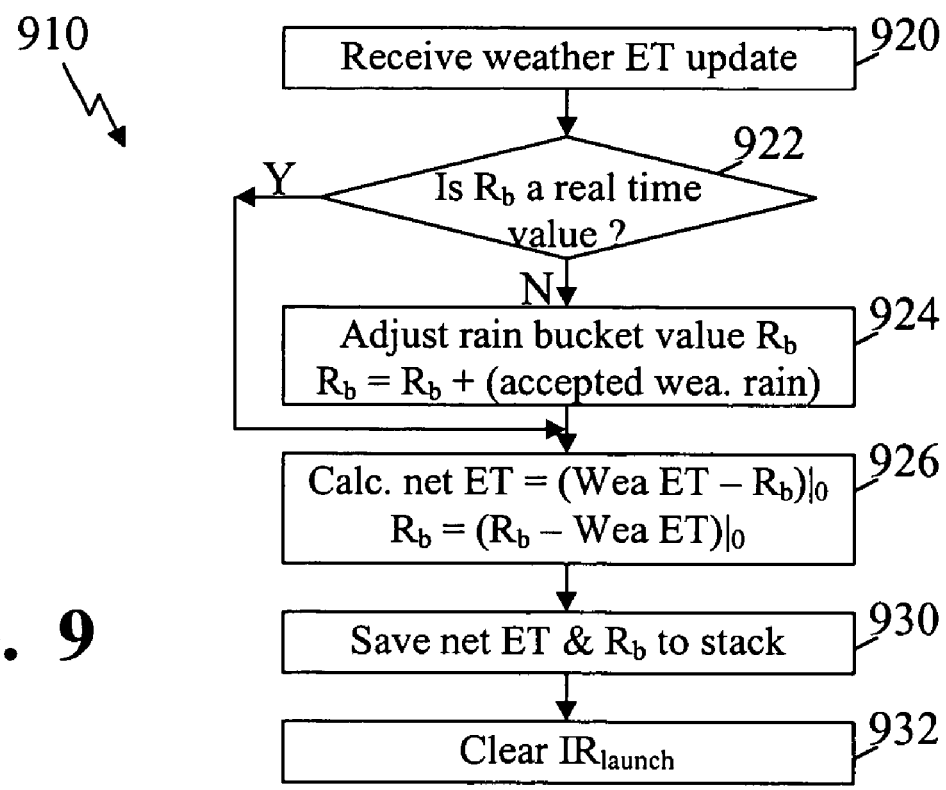
FIG. 9 depicts a simplified flow diagram of a process that compensates rain detection values and calculates net ET values based in part on updated weather ET values received from weather stations.
Figure 10:
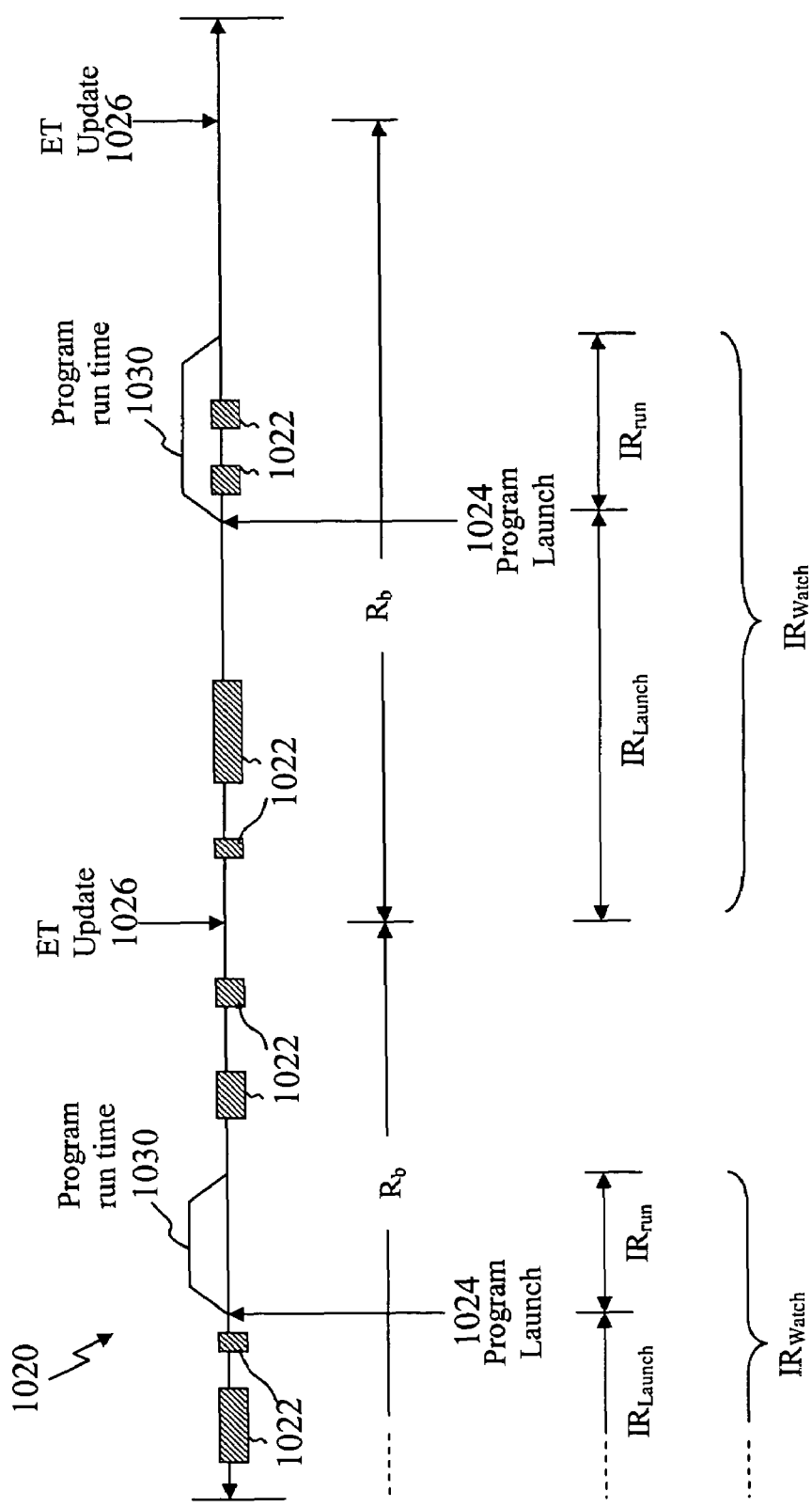
FIG. 10 depicts a graphical representation of a time line showing received rain and the launching of irrigation programs for irritation systems.

FIG. 9 depicts a simplified flow diagram of a process 910 that compensates rain detection values and calculates net ET values based in part on updated weather ET values received from weather stations. FIG. 10 depicts a graphical representation of a time line 1020 showing received rain 1022 and the launching 1024 of irrigation programs for irrigation systems. Referring to FIGS. 9 and 10, in step 920 an ET update 1026 is received, typically from a weather station. For example, a controller can request an ET value, or a weather station can periodically supply an ET value update (e.g., once every 24 hours). In step 922, the process determines whether a measured amount of rain $R_b$ (e.g., the simulated rain bucket) is a real time value and thus adjusted over time to disregard non-usable rain (i.e., calculated and/or updated over the course of an ET day) or whether the measured rain bucket $R_b$ should be adjusted at the ET update 1026. When the rain bucket value is based on real time adjustments, the process skips to step 926. Alternatively, when the rain bucket value is not a real time measure of effective rain but instead is simply a total measure of rain and is to be updated to define the real time usable amount of rain, step 924 is entered where the rain bucket value is adjusted to compensate for ineffective and/or unusable amounts of rain (e.g., often measured at the weather station based on a maximum hourly rate of rain).

In step 926, a net ET value is calculated by subtracting the effective rain bucket value $R_b$, where the net ET value is clamped to zero so that the net ET is not less than zero. The rain bucket value is further adjusted at the ET update 1026 to define an adjusted effective rain bucket value $R_{b-ET}$ also clamped to zero, which is similarly calculated by subtracting the effective rain bucket value $R_b$ by the ET update 1026 from the weather station. According to the effective total amount of rain detected, based on a rain bucket value $R_b$ measured between ET updates. Typically one of the calculated net ET value or the adjusted rain bucket value $R_{b-ET}$ is zero. In step 930, the net ET and adjusted rain bucket $R_{b-ET}$ values are stored. In step 932, a launch incremental rain parameter and/or counter $IR_{launch}$ defining an amount of rain detected between receiving the ET update 1026 and a launching of the irrigation program 1024 is cleared or reset. Following the process 910, the system is prepared to launch irrigation programs that utilize the adjusted net and/or adjusted rain bucket values in determining irrigation runtimes.

Figure 11:
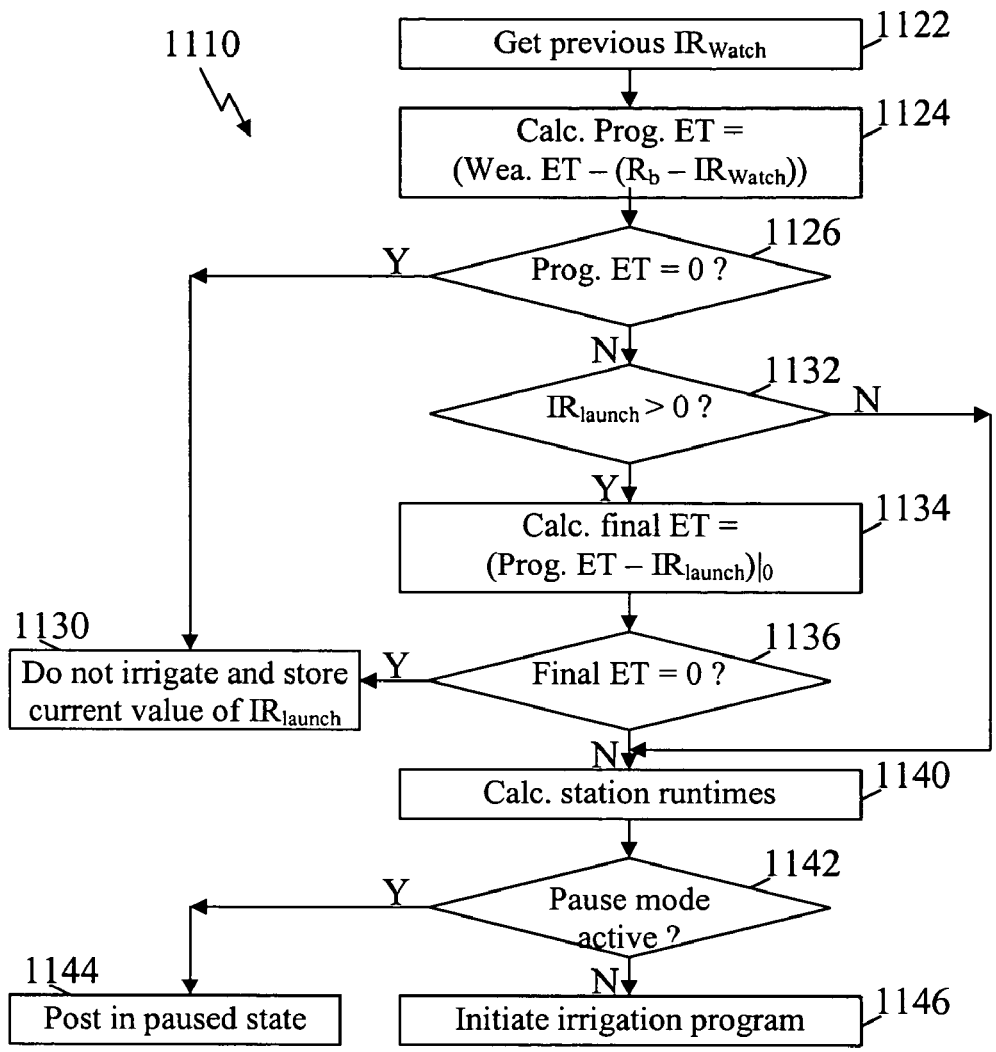
FIG. 11 depicts a simplified flow diagram of a process that determines station runtimes based in part on rain compensated for in a preceding program launch.

Some embodiments further take into account rain adjusted for in previous runtimes. These embodiments track the amount of rain compensated for prior to launching irrigation programs ($IR_{launch}$) and during irrigation runtimes ($IR_{run}$). FIG. 11 depicts a simplified flow diagram of a process 1110 that determines station runtimes based in part on rain compensated for in a preceding program launch to avoid compensating twice for the same rain (e.g., avoiding double dipping).

Referring to FIGS. 10 and 11, at a program launch 1024, the process 1110 enters step 1122 where a previous runtime watch incremental rain parameter $IR_{Watch}$ calculated for a preceding program run is retrieved. As discussed above, the watch incremental rain parameter $IR_{Watch}$ is the summation of rain 1122 detected between an ET update and a launch, plus incremental rain detected during a runtime $IR_{run}$. In step 1124, a program specific ET value is calculated for a specific irrigation program (e.g., an irrigation program to irrigate the fairways of holes 3–5 of a golf course). In some embodiments, the program specific ET is defined by the received weather station ET update 1026 minus the sum of a real time rain bucket value $R_b$ minus a previous watch incremental rain parameter $IR_{Watch}$:

$$Prog.ET = (WeatherET\ update - (R_b - IR_{Watch})).$$

The real time rain bucket value $R_b$, in some implementations, is defined as the adjusted rain bucket value $R_{b\text{-}ET}$ at ET update minus rain detected between the current ET update 1026 the current program launch 1024.

In step 1126, it is determined whether the program specific ET value is zero. When the program specific ET value is zero, the process enters step 1130 where current irrigation is prevented and a launch incremental rain parameter and/or counter $IR_{launch}$, defining an amount of rain detected between receiving the ET update 1026 and the launch of the irrigation program 1024, is stored for a subsequent program launch. Alternatively, when the program specific ET is not zero in step 1126, step 1132 is entered where it is determined whether launch incremental rain parameter $IR_{launch}$ (i.e., the rain detected between the ET update and the program launch) is greater than zero. If the $IR_{launch}$ is equal to zero, the process skips to step 1140. Alternatively, when the $IR_{launch}$ is greater than zero, step 1134 is entered where a final ET value is calculated based on the program specific ET minus the $IR_{launch}$ value, which is clamped or limited to zero. In step 1136, the process determines whether the final ET is equal to zero. If the final ET is zero, the process shifts to step 1130 where the irrigation program is not launched and the $IR_{launch}$ parameter is stored.

When the final ET is found to be greater than zero in step 1136, step 1140 is entered where station runtimes are calculated for each station controlled by the specific irrigation program. In step 1142, it is determined whether the system is actively within a pause mode when the launch 1024 is detected (i.e., rain was detected at the time or shortly before the launch was initiated). If it is determined that the launch 1024 is activated during a pause mode, step 1144 is entered where the runtimes are posted and the irrigation program is paused to await the resume and/or shutdown signals. Alternatively, when the pause mode is not active, the process 1110 continues to step 1146 where the irrigation program is initiated according to the calculated runtimes, and the $IR_{launch}$ value is stored for a subsequent launch.

The process 1110, at least in part, avoids double counting or compensating for a measured rain for which compensation has already been implemented. The ET updates 1026 provide updated information, but this information is periodically provided and does not include compensation for rain detected after the update. At the termination of the irrigation program runtime 1030, the system calculates a runtime watch incremental rain parameter $IR_{Watch}$ by summing the values of the launch incremental rain parameter $IR_{launch}$ and runtime incremental rain parameter $IR_{run}$. This allows adjustments, in some embodiments, for future ET updates and/or rain compensations as described above.

Figure 12:
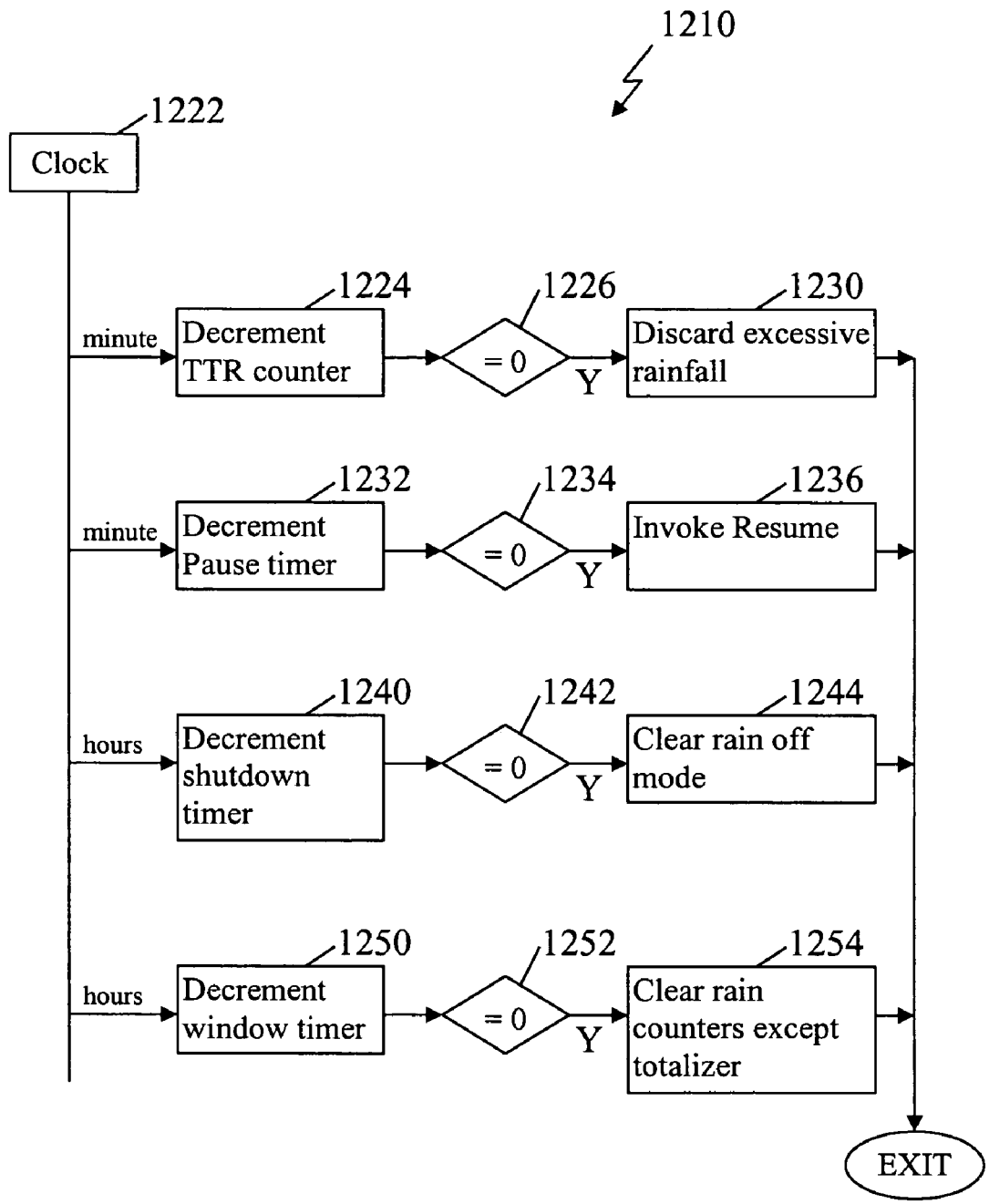
FIG. 12 depicts a simplified block diagram of a timing system for timing implementations utilized in some embodiments.

As described above, some embodiments utilize timing and/or employ timing thresholds. FIG. 12 depicts a simplified block diagram of a timing system 1210 for timing implementations utilized in some embodiments. A clock or timing generator 1222 supplies timing signals. The timing signals can be at substantially any relevant frequency, such as per second, per minute, per hour or some other period and/or combination of periods. A time-to-runoff (TTR) timer or counter 1224 tracks a first timing frequency in determining the rate of rain. In some implementations, the time-to-runoff timer counts down from a pre-set level. Once the time-to-runoff timer count reaches zero 1226, rainfall received in excess of a threshold level is discarded at 1230. The time-to-runoff generally operates at relatively small units of time, such as per minute, but other time units can be used, such as seconds, tens of seconds or other relevant timing.

The timing system, in some embodiments, further includes a pause timer 1232 that is activated and/or reset at each unit of rain detected. The pause timer decrements from a threshold time (e.g., 10 minutes) and if it reaches zero 1234, the irrigation is resumed at 1236. Typically, the pause timer operates at relatively small increments of time, such as minutes. Similarly, a shutdown timer 1240 is further included that is activated upon the detection of an amount of rain exceeding a shutdown threshold. The shutdown timer counts down from a threshold time period. Once the shutdown timer reaches zero 1242, the irrigation system is shifted from a shutdown mode to an active mode 1244 to again allow automatic starts. Typically, the shutdown time is defined in hours and thus tracks hours, however, other time periods can be employed.

Some embodiments further include a rain watch window timer 1250 that tracks received rain pulse to identify when rain is considered "old" rain. When a detected amount of rain is identified as being received outside the rain watch window 1252 (e.g., the rain watch window timer counts down from a threshold to a zero level), the identified old rain is cleared 1254 from measurement parameters and not used in determining runtime adjustments. In some embodiments, the rain watch window extends over several hours, and some implementations of the rain watch window timer 1250 decrement on hourly increments. The timing system 1210 is depicted in FIG. 12 with four timers and/or counters. This system, however, can include substantially any number of timers for further implementing timing relevant activations and/or deactivations. Further, the timers and/or counter 1224, 1232, 1240 and 1250 are described with reference to FIG. 12 as decremental timers or counters, however it will be apparent to one skilled in the art that the timers and/or counters can be incremental timers or counters without departing from the novelty of the present embodiments.

Figure 13:
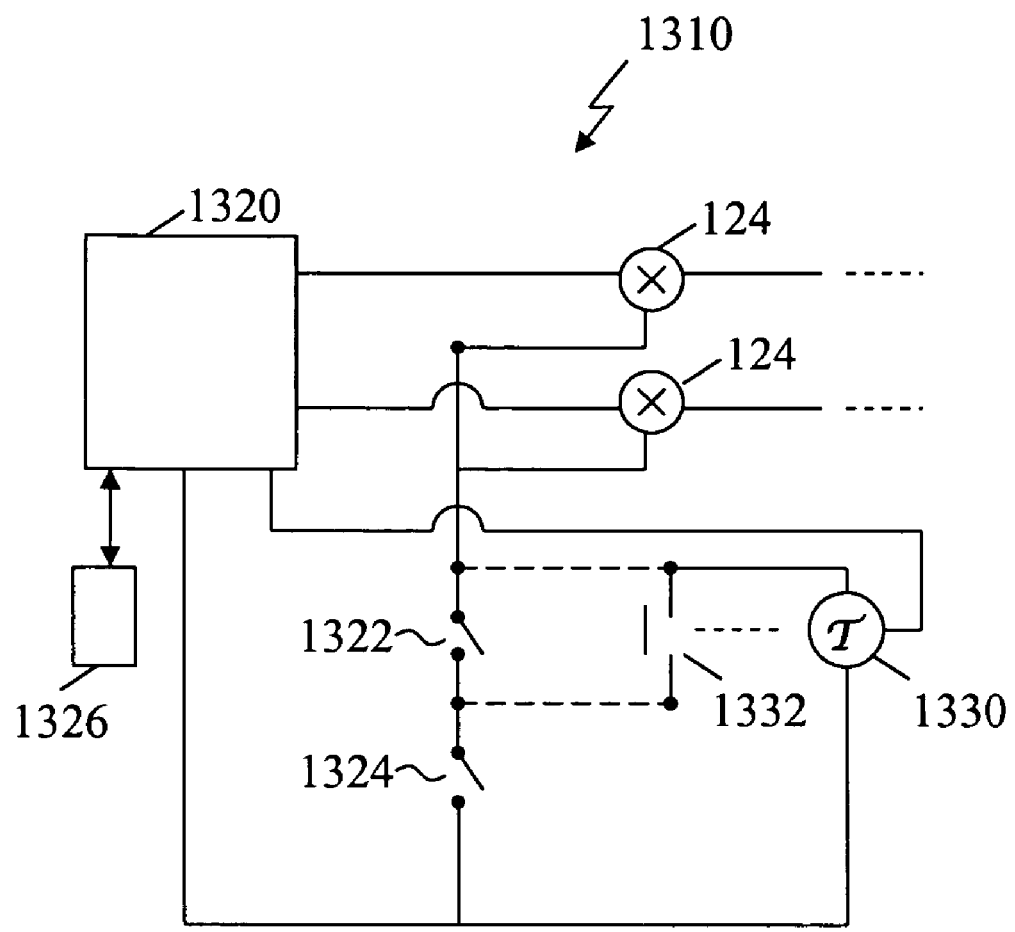
FIG. 13 depicts a simplified block diagram of an irrigation system according to some embodiments.

Some present embodiments simplify the implementation of the pause and shutdown of one or more irrigation field stations by employing one or more switches or other devices that open or close contacts. FIG. 13 depicts a simplified block diagram of an irrigation system 1310 according to some embodiments. The system includes one or more controllers 1320 that control one or more valves or field stations 124 to implement an irrigation program. Each field station is coupled to one or more sprinklers or other water delivery devices (not shown) to distribute water.

One or more rain detectors 1322, 1324 are employed that monitor rain and deactivate the field stations 124 at threshold levels. In some embodiments, the rain detectors are implemented through mini-click devices or other such devices that are triggered or activated (to open or close depending on an implementation) at predefined rain threshold levels. A first mini-click 1322 is preferably set to a relatively low rainfall level so as to cause the mini-click to trigger at early stages of rain. Upon triggering of the first mini-click, the field stations 124 are paused. For example, the system 1310 shows the mini-click 1322 as a switch that disconnects the field stations from a common voltage (e.g., ground). In some embodiments, the controller 1320 pauses the irrigation for a predefined period of time upon the detection of the transition of the first switch 1322. If a shutdown threshold of rain has not been received (as described below) by the end of the predefined pause period, the irrigation program is resumed. For example, when utilized in a residential implementation, the system causes an early pause at an early detection of rain fall. If the shutdown is not triggered in the predefined pause period of time (e.g., one hour, half hour or some other time period), the system resumes irrigation, and thus simply delays the irrigation for predefined period waiting to see if enough rain is received to shutdown the irrigation.

In some embodiments, following the activation of the first detector, if the rain stops, the first mini-click 1322, in some implementations, resets after a threshold period where rain is not detected (e.g., the mini-click rapidly dries out and is again triggered to activate the field stations). In some embodiments, an additional rain detector, rain measuring device and/or weather station 1326 is further coupled with the controller. The controller detects and/or is notified of the first triggering of the first mini-click and tracks the amount of rain detected through the measuring device 1326. Upon the subsequent triggering of the mini-click to reactivate the field stations, the controller again detects and/or is notified of the triggering. The controller determines an equivalent rain irrigation runtime based on detected effective rain and adjusts the station runtime and/or remaining station runtime by the rain station runtime.

In some embodiments, the controller 1320 and/or an optional timer 1330 couple with a pause bypass switch 1332 that couples across the first rain detector 1322. The controller initiates the bypass switch 1332 when the predefined pause period of time. Additionally and/or alternatively, the timer is activated upon triggering of the first rain detector 1322, and is reset while rain is still detected. Once rain is no longer detected, the timer counts to a threshold and activates the bypass 1332 to bypass the triggered first rain detector allowing the irrigation to resume. The timer further couples with the controller in some implementations to notify the controller that the pause timing threshold was reached and the irrigating was resumed. The controller, in some implementations, determines an amount of effective rain detected during the pause and adjusts the runtime accordingly. In some embodiments, the timer is incorporated into the controller and the controller couples with the bypass switch to activate the bypass switch.

If the rain continues and a second threshold amount of rain is received, the second rain detector 1324 is triggered or activated causing a shutdown of at least the relevant field stations 124 (except, in some embodiments, for field stations specified with set system off overrides). The controller detects the shutdown and suspends further irrigation for at least the relevant field stations for the shutdown period of time (e.g., until a next scheduled irrigation launch). Similar to the first detector 1322, the second detector 1324 is reset or triggered when rain is no longer detected for a second period of time allowing irrigation at subsequent scheduled irrigation times (e.g., the next day).

Although the system 1310 is shown with two rain detector switches 1322, 1324, it will be apparent to those skilled in the art that a single detector can be utilized to identify both the first threshold and to trigger the first switch, and the second threshold to trigger the second switch, without departing from the novel aspects of the present embodiments. Similarly, the controller can monitor the amount of rain in some implementations and trigger the switches.

Some embodiments initiate the activation of one or more valves and/or field stations according to irrigation programming schedules, and if the system is currently in a pause mode, the irrigation through the one or more field stations is immediately paused. Alternatively, if the shutdown threshold has been reached, the system ignores scheduled irrigation start times. Some alternative embodiments, however, similarly prevent the activation of scheduled irrigation when the system is in a pause mode and alternatively delays the schedule until the pause time threshold expires after rain stops to initiate the irrigation schedule, or shuts down scheduled irrigation if the shutdown threshold is reached.

Some embodiments are provided with default parameters such as the pause rain threshold, the pause timer, the shutdown threshold and other similar parameters. Users in some embodiments define parameters, and/or change default values for parameters. Additionally, some embodiments provide for a relatively quick setup to allow the system to be implemented, and further allows the user to go back later and alter the system to provide more specific implementations. For example, field stations and/or sprinklers can be defined within irrigation classes having similar irrigation characteristics (e.g., sprinklers watering greens of a golf course, drip lines watering trees of a campus, and other such classes). ET reference points are defined for each class (by default or user defined). A reference amount of irrigation or an irrigation time is defined to provide the class with an expected amount of water (e.g., an average based on an average ET day). The system utilizes the reference values and makes adjustments based on variations from these reference values. For example, if an ET update value is received that is different than the reference ET value, the system determines a difference or ratio and multiplies this value by the references irrigation time to define station runtimes. The system then utilizes the incremental rain parameters to adjust the runtimes accordingly.

In some embodiments, a user interface is displayed on a computer screen allowing the user to set parameters, defaults, times, thresholds and implement other such control over the system. The interface, for example, allows the user to define the number of rain detectors being employed and identify which satellite controllers and/or field stations are associated with which detectors. Similarly, the user is able in some implementations to further define the operation of rain detectors. For example, rain detectors can be set as: offline such that the detector is disabled; system response to provide overall system measurements that are typically utilized over the system; program response that utilizes the measured rain for defined satellite controllers and/or field stations; no action allows for the detection of pulses and/or rain measurements to be received (e.g., at an alarm center) with no specific action to be take for controllers and/or field stations. The interface in some embodiments further allow the user to view statistics of the system and/or one or more rain cans, such as parameter settings and current measurements, including defined period of time for a rain watch window, pause threshold, pause timer, shutdown threshold, shutdown timer (if applicable), current levels of incremental rain parameters (e.g., pause incremental rain parameter $IR_{pause}$, shutdown incremental rain parameter $IR_{shutdown}$, launch incremental rain parameter $IR_{launch}$, runtime incremental rain parameter $IR_{run}$, and other such parameters), and an extended total rain amount or rain totalizer (that defines a total rain received since the total rain counter was reset, typically manually, to allow a historic overview of rain received, such as for a month or a season).

In some embodiments, an irrigation system is additionally provided with override functions, such as a system off override option that terminates further irrigation for some or all of the system and prevents automatic starts until the system off override is reversed. Similarly, the system allows manual activation, such as direct manual access (DMA) activations, of one or more field stations to initiate watering regardless of pause and/or shutdown threshold levels. An override can be defined that overrides the control of specific valves and/or other devices, such as valves controlling a fountain that is operated during rain and is not paused and/or shutdown, or lights also controlled through a satellite controller, or other such controlled devices to be operated irrespective of detected rain. Systems, in some embodiments, further include an override shut-off that prevents further irrigation if the system is paused until a predetermined time. For example, if the system is paused until 6:30 a.m. at a golf course, the override shut-down is activated preventing further irrigation to avoid interfering with golfers. Some embodiments compensate for the override shut-off on the next scheduled irrigation.

Some systems utilize, in addition to and/or alternatively to rain detectors, other sensors to determine irrigation adjustments, pauses, shutdowns and other controls. Soil moisture sensors are utilized in some embodiments that indicate when moisture levels increase (e.g., due to rain). In some implementations, these soil detectors are positioned where they are not affected by watering from the irrigation system.

The present embodiments provide control for implementing irrigation. Further, the present embodiments take real time advantage of rainfall, even while irrigation is in progress, as well as taking rainfall into account for following scheduled irrigation events. Using a pause threshold, the irrigation is paused until the rain stops or until a shutdown threshold is detected. If the rain stops prior to the shutdown threshold, the system resumes the irrigation while adjusting remaining runtimes by an amount equivalent to the detected rainfall. As such, the present embodiments adapt to intermittent rainfall in real time.

While the invention herein disclosed has been described by means of specific embodiments and applications thereof, numerous modifications and variations could be made thereto by those skilled in the art without departing from the scope of the invention set forth in the claims.

What is claimed is:

1. A method for use in controlling irrigation, comprising:
   determining when an amount of rain received exceeds a first threshold;
   pausing irrigation from a field station when the amount of rain exceeds the first threshold;
   determining when the amount of rain received exceeds a second threshold;
   stopping irrigation from the field station when the amount of rain exceeds the second threshold;
   determining whether a pause threshold of time has expired in the event the amount of rain received does not exceed the second threshold; and
   resuming the irrigation from the field station when the pause threshold time has expired.

2. The method of claim 1, further comprises:
   determining an amount of rain received prior to the resuming irrigation; and
   reducing a station runtime of the field station by an amount corresponding to the amount of rain received prior to the resuming irrigation.

3. The method of claim 2, further comprising:
   determining a rain irrigation runtime of an effective amount of rain received prior to the resuming irrigation; and
   the reducing the station runtime comprises reducing the station runtime by the rain irrigation runtime.

4. A method for use in controlling irrigation, comprising:
   determining when an amount of rain received exceeds a first threshold;
   pausing irrigation from a field station when the amount of rain exceeds the first threshold;
   determining when the amount of rain received exceeds a second threshold;
   stopping irrigation from the field station when the amount of rain exceeds the second threshold;
   receiving an evapotranspiration value;
   determining a net evapotranspiration value by adjusting the evapotranspiration value proportional to an amount of rain received prior to launching programmed irrigation from the field station; and
   determining a station runtime corresponding to the net evapotranspiration.

5. A method for use in controlling irrigation, comprising:
   determining when an amount of rain received exceeds a first threshold;
   pausing irrigation from a field station when the amount of rain exceeds the first threshold;
   determining when the amount of rain received exceeds a second threshold;
   stopping irrigation from the field station when the amount of rain exceeds the second threshold;
   determining a rain watch window of time; and
   eliminating detected rain that was detected outside the rain watch window of time from the determining when the amount of rain received that exceeds the first threshold and the determining when the amount of rain received that exceeds the second threshold.

6. A method for use in controlling irrigation, comprising:
   pausing irrigation at a field station when an amount of rain detected exceeds a first threshold;
   detecting an indication of an amount of rain received after the pausing;
   resuming irrigation at the field station;
   reducing a station runtime corresponding to the amount of the rain received after the pausing;
   receiving an evapotranspiration value;
   detecting an indication of an amount of rain received after receiving the evapotranspiration value;
   adjusting the evapotranspiration value by an amount proportional to the amount of rain received after receiving the evapotranspiration value defining a net evapotranspiration value; and
   determining the station runtime for the field station based on the net evapotranspiration value.

7. The method of claim 6, wherein the reducing the station runtime further comprises:
- determining a time-to-runoff relative to the field station;
- determining whether the amount of rain received after receiving the evapotranspiration value exceeds the time-to-runoff;
- reducing the amount of rain received after receiving the evapotranspiration value by an amount of rain that exceeds the time-to-runoff when the amount of rain received after receiving the evapotranspiration value exceeds the time-to-runoff; and
- the adjusting the evapotranspiration value comprises adjusting the evapotranspiration value by the reduced amount of rain.

8. A method for use in controlling irrigation, comprising:
- pausing irrigation at a field station when an amount of rain detected exceeds a first threshold;
- detecting an indication of an amount of rain received after the pausing;
- resuming irrigation at the field station;
- reducing a station runtime corresponding to the amount of the rain received after the pausing;
- determining an irrigation rate for the field station;
- calculating a rain irrigation runtime based on the amount of the rain received after the pausing and the irrigation rate for the field station;
- the reducing the station runtime comprises reducing the station runtime by the rain irrigation runtime;
- determining a time-to-runoff relative to the field station;
- determining an amount of rain received after the pausing that exceeds the time-to-runoff;
- defining an adjusted amount of rain received after the pausing by reducing the amount of rain received after the pausing by the amount of rain exceeding the time-to-runoff; and
- the calculating the rain irrigation runtime comprises calculating the rain irrigation runtime based on the adjusted amount of the rain received after the pausing and the irrigation rate for the field station.

9. A method for use in controlling irrigation, comprising:
- pausing irrigation at a field station when an amount of rain detected exceeds a first threshold;
- detecting an indication of an amount of rain received after the pausing;
- resuming irrigation at the field station;
- reducing a station runtime corresponding to the amount of the rain received after the pausing;
- determining a rain watch window of time; and
- the reducing the station runtime comprises reducing the station runtime by the amount of the rain received prior to an expiration of the rain watch window.

10. A system for use in controlling irrigation, comprising:
- a controller;
- a field station coupled with the controller, wherein the controller activates the field station to irrigate;
- a first switch coupled with the field station, where the first switch transitions when an amount of rain detected exceeds a first threshold causing the field station to pause the irrigating; and
- a second switch coupled with the field station, where the second switch transitions when an amount of rain detected exceeds a second threshold causing the field station to stop the irrigating.

11. The system of claim 10, further comprising:
- a bypass switch coupled across the first switch;
- a timer coupled with the bypass switch, and the timer activates the bypass switch to bypass the first switch when a pause time expires causing the field station to resume irrigating in the event the amount of rain received does not exceed the second threshold.

12. The system of claim 11, further comprising:
- a rain detector coupled with the controller to identify an amount of rain detected prior to the field station resuming irrigating, wherein the controller adjusts a station runtime of the field station corresponding to the amount of rain detected prior to the field station resuming irrigating.

13. The system of claim 10, wherein the first switch again transitions when rain is no longer detected causing the field station to resume the irrigating in the event the amount of rain received does not exceed the second threshold.

14. The system of claim 13, wherein the controller adjusts a station runtime of the field station corresponding to an amount of rain detected prior to the field station resuming irrigating.

15. A system for use in irrigation, comprising:
- a controller;
- a field station coupled with the controller such that the controller controls irrigation through the field station; and
- a rain detector coupled with the controller such that the controller monitors an amount of rain detected through the rain detector;
- wherein the controller pauses irrigation from the field station when a first threshold amount of rain is detected and shuts down irrigation from the field station when a second threshold amount of rain is detected; and
- wherein the controller comprises a timer such that the controller further resumes irrigation through the field station when a pause threshold of time has expired.

16. The system of claim 15, wherein the controller further comprises a rain compensator that determines a rain irrigation runtime proportional to an amount of rain received prior to the expiration of the pause threshold of time, such that the controller reduces the runtime of the field station by the rain irrigation runtime.

17. A system for use in irrigation, comprising:
- a controller;
- a field station coupled with the controller such that the controller controls irrigation through the field station; and
- a rain detector coupled with the controller such that the controller monitors an amount of rain detected through the rain detector;
- wherein the controller pauses irrigation from the field station when a first threshold amount of rain is detected and shuts down irrigation from the field station when a second threshold amount of rain is detected;
- wherein the controller further comprises an evapotranspiration evaluator, wherein the evapotranspiration evaluator receives an evapotranspiration value and determines a station runtime for the field station proportional to the evapotranspiration value; and
- wherein the controller further comprises a rainfall compensation calculator that determines a rain irrigation runtime according to the amount of rain received prior to the resuming irrigation, and the field station controller adjusts the station runtime by the rain irrigation runtime.

18. A system for use in irrigation, comprising:
- a controller;

a field station coupled with the controller such that the controller controls irrigation through the field station; and a rain detector coupled with the controller such that the controller monitors an amount of rain detected through the rain detector;

wherein the controller pauses irrigation from the field station when a first threshold amount of rain is detected and shuts down irrigation from the field station when a second threshold amount of rain is detected;

wherein the controller further comprises an evapotranspiration evaluator, wherein the evapotranspiration evaluator receives an evapotranspiration value and determines a station runtime for the field station proportional to the evapotranspiration value; and wherein the evapotranspiration evaluator determines a net evapotranspiration value by adjusting the received evapotranspiration value proportional to an effective amount of rain received prior to the resuming irrigation, and determines the station runtime according to the net evapotranspiration.

19. A method for use in controlling irrigation, comprising:

identifying a rain watch window of time wherein the rain watch window of time is a period of time before a current time in which rain received is relevant to a determination affecting current watering needs; and resetting the rain watch window of time when rain is detected;

monitoring an amount of rain detected;

detecting that the rain has stopped;

activating the rain watch window of time when rain has stopped; and clearing the monitored amount of rain detected when the rain watch window of time expires.

* * * * *